United States Patent
Anthony et al.

(10) Patent No.: US 10,154,112 B1
(45) Date of Patent: Dec. 11, 2018

(54) CLOUD-TO-CLOUD DATA MIGRATION VIA CACHE

(71) Applicant: EMC Corporation, Hopkinton, MA (US)

(72) Inventors: Michael D. Anthony, Wilmington, MA (US); John W. Bates, Mendon, MA (US); Nicos A. Vekiarides, Natick, MA (US); David King, Sudbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 454 days.

(21) Appl. No.: 14/619,627

(22) Filed: Feb. 11, 2015

(51) Int. Cl.
*G06F 15/173* (2006.01)
*H04L 29/08* (2006.01)

(52) U.S. Cl.
CPC ...... *H04L 67/2852* (2013.01); *H04L 67/1097* (2013.01)

(58) Field of Classification Search
CPC .................. H04L 67/2852; H04L 67/1097
USPC ........................................................ 709/213
See application file for complete search history.

(56) References Cited

U.S. PATENT DOCUMENTS

| 8,250,335 | B2* | 8/2012 | Whyte ................. G06F 3/0608 711/114 |
| 8,805,951 | B1* | 8/2014 | Faibish ................ G06F 9/5072 709/213 |
| 2009/0274300 | A1* | 11/2009 | Tou ..................... H04L 63/0428 380/255 |
| 2010/0199042 | A1* | 8/2010 | Bates ................... H04L 67/289 711/114 |
| 2011/0167230 | A1* | 7/2011 | Quan .................... G06F 3/061 711/154 |
| 2013/0246623 | A1* | 9/2013 | Seth ...................... H04L 47/783 709/226 |

* cited by examiner

*Primary Examiner* — Tauqir Hussain
(74) *Attorney, Agent, or Firm* — Anderson Gorecki LLP (57) ABSTRACT

A cloud storage gateway is used to migrate a volume from a source cloud storage provider to a target cloud storage provider. If necessary, the gateway reconfigures the size of a logical cache associated with local storage devices so that the entire volume can be stored locally. Flushing is disabled and all of the locally stored volume pages are marked as dirty. After compression and encryption policies associated with the source and target are verified to be compatible, flushing is enabled and metadata is updated.

18 Claims, 4 Drawing Sheets

VALIDATION

CLOUD-TO-CLOUD DATA MIGRATION VIA CACHE

CROSS-REFERENCE TO RELATED APPLICATIONS

NA

BACKGROUND

Aspects of this disclosure are generally related to enterprise data storage systems. Enterprise data storage systems are used to maintain relatively large data sets and support a relatively large number of concurrent users. The data storage systems may include multiple physical storage devices, possibly including storage devices of various different technology types. For example, high performance storage devices may be used for the most active or important data, whereas less costly and lower performance storage devices may be used for relatively less frequently accesses or less important data. Storage device technology types may include EFD (Enterprise Flash Drive), Fibre Channel and SATA (Serial Advanced Technology Attachment), for example and without limitation. Inactive or infrequently accessed data may be archived on even lower performance storage devices such as magnetic tape drives which may be stored offsite and require manual retrieval. Such storage devices may also be used for off-site data backup. Cloud storage is an alternative for data backup and storage of inactive or infrequently accessed data. Cloud storage providers maintain data centers with pools of physical storage devices which are accessible to enterprises via a private or public network, e.g., the internet. Cloud storage providers typically charge based on the amount of storage used, and take responsibility for maintaining availability of additional data storage resources, preventing data loss and maintaining data availability.

SUMMARY

In accordance with an aspect, an apparatus via which a data set is migrated from a source cloud storage provider to a target cloud storage provider comprises: at least one physical data storage device; a logical data storage device associated with the at least one physical storage device, at least a portion of the data set being logically stored on the logical storage device and actually stored on the at least one physical storage device associated with the logical storage device; at least one processor configured to verify that the entire data set is logically stored on the logical storage device and thereby actually stored on the at least one physical storage device associated with the logical storage device; and an interface configured to transmit the data set from the at least one physical storage device to the target cloud storage provider. In some implementations the at least one processor is configured to change a size of the logical storage device to be large enough to accommodate the entire data set. In some implementations the at least one processor is configured to change an amount of space on the at least on physical storage device that is associated with the logical storage device. In some implementations the at least one processor is configured to determine whether a first compression policy associated with the source cloud storage provider is compatible with a second compression policy associated with the target cloud storage provider. In some implementations the at least one processor is configured to determine whether a first encryption policy associated with the source cloud storage provider is compatible with a second encryption policy associated with the target cloud storage provider. In some implementations the at least one processor is configured to update metadata associated with the data set.

In accordance with another aspect a method of migrating a data set from a source cloud storage provider to a target cloud storage provider comprises: verifying that the entire data set is logically stored on a logical storage device and thereby actually stored on at least one physical storage device associated with the logical storage device; and transmitting the data set from the at least one physical storage device to the target cloud storage provider. In some implementations the method comprises changing a size of the logical storage device to be large enough to accommodate the entire data set. In some implementations the method comprises changing an amount of space on the at least on physical storage device that is associated with the logical storage device. In some implementations the method comprises determining whether a first compression policy associated with the source cloud storage provider is compatible with a second compression policy associated with the target cloud storage provider. In some implementations the method comprises determining whether a first encryption policy associated with the source cloud storage provider is compatible with a second encryption policy associated with the target cloud storage provider. In some implementations the method comprises updating metadata associated with the data set.

In accordance with another aspect a computer program stored on a non-transitory computer-readable medium comprises: code which verifies that the entire data set is logically stored on a logical storage device and thereby actually stored on at least one physical storage device associated with the logical storage device; and code which transmits the data set from the at least one physical storage device to the target cloud storage provider. In some implementations the program further comprises code which changes a size of the logical storage device to be large enough to accommodate the entire data set. In some implementations the program further comprises code which changes an amount of space on the at least on physical storage device that is associated with the logical storage device. In some implementations the program further comprises code which determines whether a first compression policy associated with the source cloud storage provider is compatible with a second compression policy associated with the target cloud storage provider. In some implementations the program further comprises code which determines whether a first encryption policy associated with the source cloud storage provider is compatible with a second encryption policy associated with the target cloud storage provider. In some implementations the program further comprises code which updates metadata associated with the data set.

DETAILED DESCRIPTION

All of the features, aspects, embodiments and implementations described herein can be combined in any technically feasible way. Specific examples may be provided in this description to provide context and convey inventive concepts. However, the examples are not to be considered as limiting.

Figure 1:
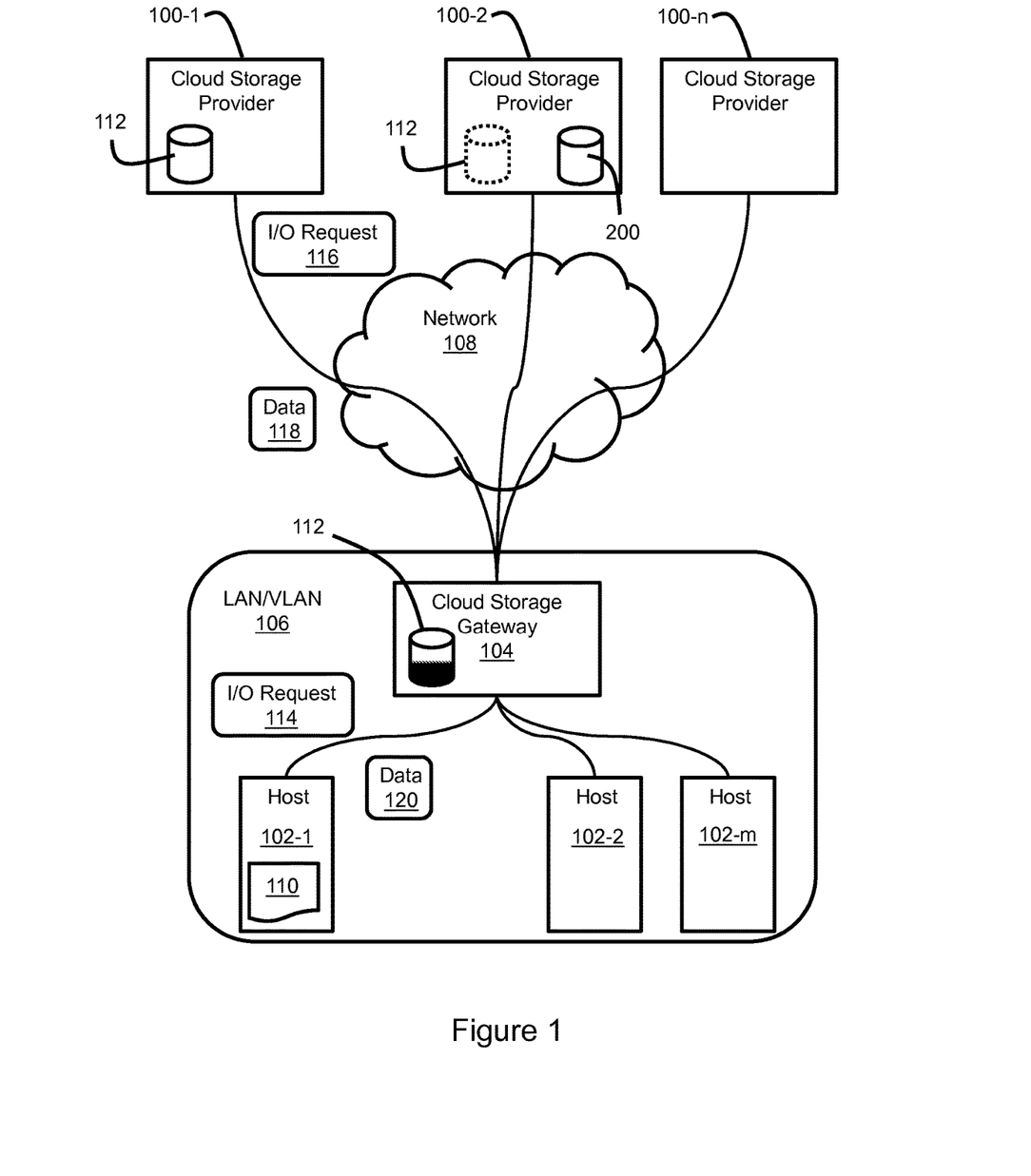
FIG. 1 illustrates a network in which an enterprise uses data storage resources of one or more cloud storage providers.

FIG. 1 illustrates a network in which an enterprise uses data storage resources of one or more cloud storage providers 100-1, 100-2 through 100-$n$. Various types of enterprise devices, referred to as hosts 102-1, 102-2 through 102-$m$, access data maintained by the cloud storage providers via a cloud storage gateway 104. The cloud storage gateway is an enterprise data storage system which may function as both a storage array and a gateway to cloud storage. In the illustrated example the cloud storage gateway 104 is a physical device in an enterprise network such as a LAN/VLAN 106 (Local Area Network or Virtual Local Area Network). However, the cloud storage gateway might be implemented as a hosted device by an entity other than the enterprise, e.g., as a service. The cloud storage providers 100-1, 100-2 through 100-$n$ are available to provide data storage to the enterprise via a network 108, e.g., the internet. Each cloud storage provider maintains its own data storage resources. The data storage resources may include multiple data centers, which may be geographically diverse. Each data center may include one or more pools of physical storage devices. Host devices within the enterprise network run applications, e.g., application 110, which use data that may be maintained by one or more of the cloud storage providers 100-1, 100-2 through 100-$n$, the cloud storage gateway 104, and any combination thereof.

In order to enable the applications running on the hosts to use the data storage resources of the cloud storage providers, the cloud storage gateway functions as an intermediary device. For example, the cloud storage gateway presents logical volumes, e.g., volume 112, of storage to the host devices. The data associated with the logical volumes is maintained on physical storage devices maintained by the cloud storage providers. When application 110 running on host device 102-1 generates an I/O request 114 associated with volume 112, the I/O request is sent from the host device to the cloud storage gateway 104. The cloud storage gateway may then respond to the I/O request by communicating with the cloud storage provider, e.g., cloud storage provider 100-1, which maintains the data associated with the volume 112 associated with the I/O request 114. More particularly, the cloud storage gateway translates the I/O request 114 from the host device into an I/O request 116 in a form which can be processed by the cloud storage provider 100-1. Cloud storage providers and host devices are typically configured to utilize different protocols for I/O requests. For example and without limitation, host devices may utilize a transport layer protocol such as iSCSI (internet small computer system interface) or NAS (Network-Attached Storage) protocols such as NFS (Network File System), SMB (Server Message Block), CIFS (Common Internet File System) and AFP (Apple Filing Protocol). In contrast, for example and without limitation, cloud storage providers may utilize a variety of different non-standard and provider-specific APIs (Application Programming Interfaces) such as AWS (Amazon Web Services), Dropbox, OpenStack, Google Drive/Storage APIs based on, e.g., JSON (JavaScript Object Notation). In response to receipt of, e.g., an iSCSI Read I/O request from a host, the cloud storage gateway may translate that I/O request into a format, e.g., OpenStack, which can be processed by the cloud storage provider to which the translated Read I/O Request is then provided. The cloud storage provider responds to the translated Read I/O Request by returning the corresponding data to the cloud storage gateway, e.g., data 118, which provides the data to the host device in an expected form. In the case of a Write operation the I/O request from the host device would be accompanied by data, e.g., data 120. The cloud storage gateway would translate the I/O request, e.g. from iSCSI to Openstack, and send the translated I/O request to the cloud storage provider with the data provided by the host device in accordance with the cloud storage provider API.

Figure 2:
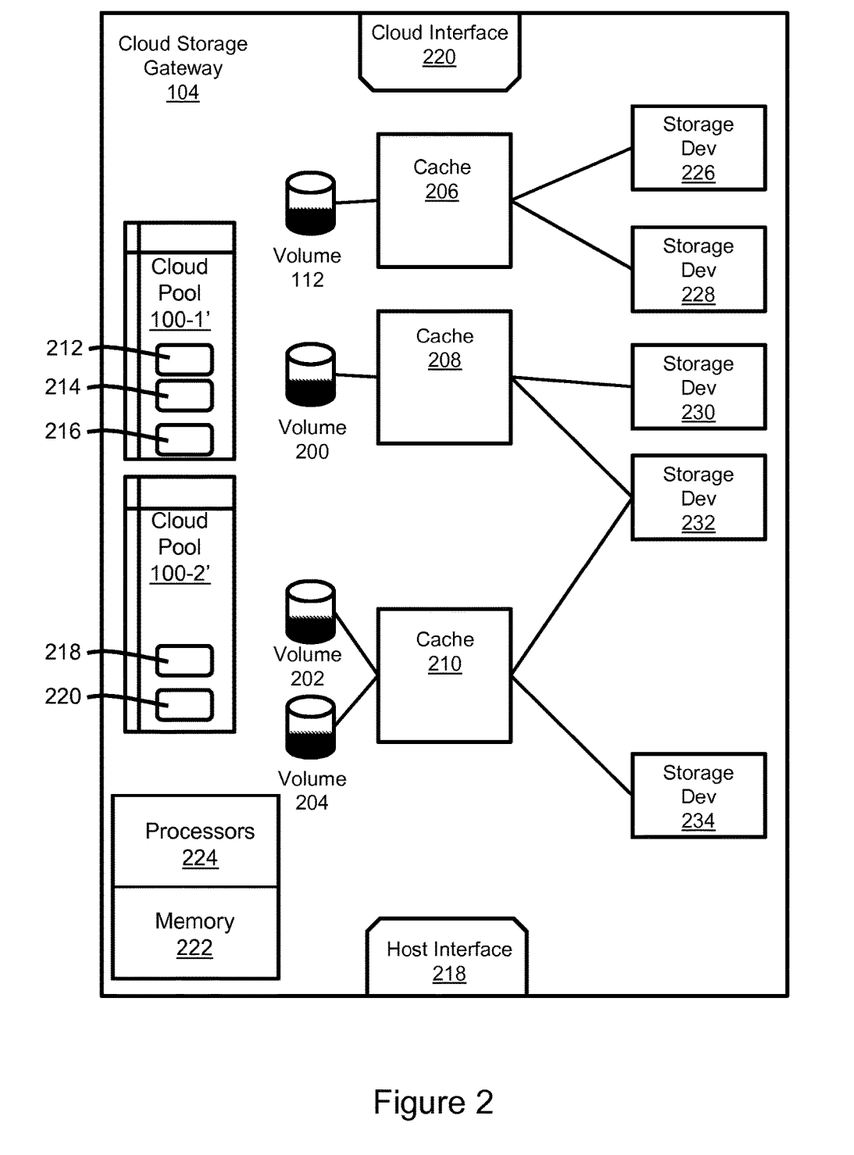
FIG. 2 illustrates the cloud storage gateway in greater detail.

Referring now to FIGS. 1 and 2, the cloud storage gateway 104 creates and maintains at least one data record instance ("cloud pool") associated with each cloud storage provider that is used, e.g., cloud pool 100-1' corresponding to cloud storage provider 100-1, and cloud pool 100-2' corresponding to cloud storage provider 100-2. The cloud pool may include a container which identifies and associates a particular cloud storage provider with one or more of the volumes 112, 200, 202, 204 and logical caches 206, 208, 210. For example, cloud pool 100-1' may indicate that cloud storage provider 100-1 is associated with volume 112, which is associated with cache 206. The cloud pool may also include metadata 212 which is indicative of where data associated with the volume is stored by the cloud storage provider. The metadata would not typically indicate specific physical storage devices of the cloud storage provider but rather a location on a logical device or other data structure in accordance with the API of the cloud storage provider. The metadata may be used in support of I/Os. For example, the host device may process I/Os at the file or block level, whereas the cloud storage provider API may process I/Os based on a page or extent size which tends to be much larger. The metadata maps between the logical device or data structure defined by the cloud storage provider API so that, e.g., a host I/O request to Write a block of data may result in a cloud storage gateway request to Write a page of data. Similarly, a host request to Read a block of data could result in a cloud storage gateway request to Read a page of data from the cloud storage provider, although only the requested block is sent from the cloud storage gateway to the host. The cloud pool may also include one or more sets of configuration details ("policies"), e.g., policy 214, associated with the cloud storage provider.

In order to help maintain security the data provided to the cloud storage provider from the cloud storage gateway may be encrypted. For example, the data 120 may be encrypted before it is sent out of the enterprise network to cloud storage provider 100-1. The encryption keys 216 may be maintained by the enterprise, e.g., by the cloud storage gateway 104. In the case of a Write operation the data 120 being written to storage of the cloud storage provider would be encrypted by the cloud storage gateway and sent in encrypted form to the cloud storage provider. When that data is subsequently read from the cloud storage provider it is de-encrypted by the cloud storage gateway using the encryption keys maintained by the cloud storage gateway. It should be appreciated however that this is only one example and that encryption keys could be stored by other devices. A wide variety of other devices might perform encryption and de-encryption operations.

A host interface 218 is configured for communicating with the host devices. A cloud interface 220 is configured for communicating with the cloud storage providers. It will be understood that interfaces can include physical components and program code. Software stored in non-transitory computer-readable memory 222 and run by one or more physical processors 224 provides a variety of operating functions, including but not limited to I/O request translation and other functions described herein. Local physical storage devices 226, 228, 230, 232, 234 may be configured to store at least a portion of some volumes. For example, while volume 112 is stored in its entirety by the cloud storage provider 100-1, a portion of that volume may also be stored in local storage devices 226, 228. The local storage devices may include various devices from a wide variety of technology types, including but not limited to EFD, Fibre Channel and SATA devices. Local storage devices may be located within the same chassis or rack as the cloud storage gateway, elsewhere within the LAN/VLAN, or remotely located and associated with the cloud storage array via high bandwidth links, e.g., links with greater bandwidth than links between the cloud storage gateway and the cloud storage provider.

I/O requests associated with data stored in the local storage devices may be processed relatively quickly from the perspective of the hosts. For example, a Read I/O 114 from host 102-1 can be processed relatively quickly by the cloud storage gateway 104 without communicating with the cloud storage provider in the case of a cache 206 hit. In the case of a cache 206 miss a corresponding Read I/O to the cloud storage provider would be generated and sent to the cloud storage provider, which would return the data but in general not as quickly as local storage devices. In the case of a Write operation the data can be written to local storage and subsequently propagated to the cloud storage provider. It is not a requirement that any portion of the volume be maintained on local storage. Regardless of whether some or all of the volume is maintained on local storage, the entire volume presented to the hosts is maintained in physical storage devices in the data storage pools of one or more of the cloud storage providers.

The logical caches 206, 208, 210 associate logical volumes presented by the cloud storage array with the local physical storage devices of the cloud storage gateway. For example, cache 206 associates volume 112 with storage devices 226, 228. Each volume is associated with only one cache. However, multiple volumes may be associated with the same cache. Each cache is associated with one or more of the local physical storage devices. It should be noted that for the purposes of this disclosure the local physical storage devices are not necessarily non-persistent memory devices as the term "cache" is sometimes used to imply, and may include any of a wide variety of storage devices such as, without limitation, EFDs, SATA devices, and Fibre Channel devices. Multiple caches may be associated with the same local physical storage device. Each cache is configured with a particular storage capacity, and different caches may be configured with different storage capacities. For example, and without limitation, the size of the cache may be configured by limiting use to particular storage devices, or to some portion, address range or partition of one or more of the storage devices that is less than the full capacity of the storage device. Each cache may also be configured for a level of performance. For example, a high performance cache can be configured by associating the cache with high performance storage devices. A low performance cache can be configured by associating the cache with low performance storage devices. However, multiple storage devices of different technology types and performance levels may be associated with the same cache.

The portion of the volume that is maintained by local storage is determined at least in part by the configured size of the cache. For example, if the configured size of cache 206 corresponds to 20% of the size of volume 112 then up to 20% of the volume may be maintained locally in the physical storage devices 226, 228 associated with the cache. Again, however, the entire volume 112 is maintained at the cloud storage provider 100-1 regardless of what portion of the volume is also maintained by the cloud storage gateway in local storage. Because a cache can be associated with any number of the local storage devices and portions thereof, the cache may be configured with a size from 0 up to the entire local storage capacity. However, local storage capacity will typically be shared by multiple caches. Moreover, the percentage of the volume maintained locally can change due to changes in the amount of data in the volume relative to the configured cache size. Typically, although not necessarily, the most active or important data associated with the volume is selected to be maintained in the cache. However the amount of data in the volume and importance and activity level of extents of data may change over time so data may be promoted to, or demoted from, the cache.

In some circumstances it may be desirable or necessary to migrate data between different cloud storage providers. For context and without limitation, it might become desirable to migrate volume 112 from cloud storage provider 100-1 to cloud storage provider 100-2 because of a change in the importance or frequency of access of the data associated with the volume. Cloud storage providers may utilize different infrastructure and locations, in addition to using different page sizes and APIs. In addition to influencing performance from the perspective of the enterprise, these differences can influence the amounts charged by the cloud storage providers for their services, e.g. the storage cost per unit of data and unit time. Consequently, it might be desirable to have a first cloud storage provider 100-1 maintain the volume 112 when it is in active use or when the data is deemed important, and to have a second cloud storage provider 100-2 maintain the volume 112 when it is inactive or deemed to have become less important. Regardless of the reasons which prompt volume migration, this presents a technical problem because, among other things, the source cloud storage provider 100-1 and the target cloud storage provider 100-2 may use different APIs, and have different compression policies, different encryption policies. Further, the metadata maintained by the cloud storage gateway must be updated as a result of migration.

In accordance with an aspect of this disclosure an enterprise storage device such as the cloud storage gateway 104 is configured to migrate a data set such as volume 112 between different cloud storage providers such as providers 100-1 and 100-2. More particularly, the cloud storage gateway is configured to function as an intermediary repository for the volume during migration between the source cloud storage provider 100-1 and target cloud storage provider 100-2. This can be accomplished by writing data associated with volume 112 from the source cloud storage provider 100-1 to the cache 206 so that the cache is made to contain the entire volume 112 being migrated. The volume is then written from the cache 206 to the target cloud storage provider 100-2. Various other features and functions may also be included as described below.

Figure 3:
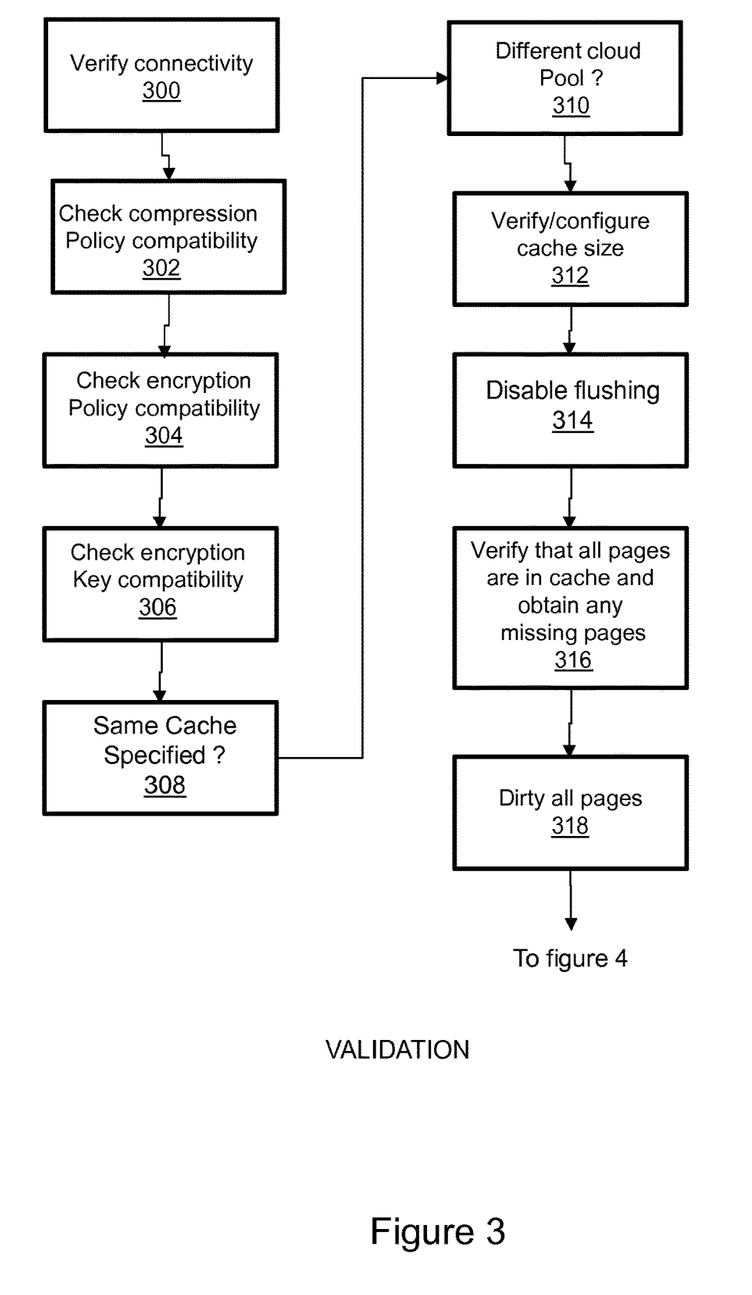
FIG. 3 illustrates validation in preparation for cloud-to-cloud data migration via the cloud storage gateway.

Referring to FIGS. 1 through 3, cloud-to-cloud migration via cache may include a validation phase. In an initial operation 300 the connectivity between the cloud storage gateway 104 and both the source cloud storage provider 100-1 and the target cloud storage provider 100-2 is verified.

This may also include determining that the source cloud storage provider is ready to transmit the data, and that the target cloud storage provider is ready to ingest the data. It may also include requesting or verifying bandwidth at a specified data rate, quality of service guarantees, dedicated wavelengths, and other features related to data transport via the network 108.

In another operation 302 the policies 214, 218 of the source cloud pool 100-1' and the target cloud pool 100-2' with regard to data compression are checked for compatibility. Data may be stored in compressed form at the cloud storage providers and uncompressed in the cache. If the target cloud pool compression policy is not compatible with the source cloud pool compression policy then the data may be compressed in accordance with the target cloud pool policy if that is practical and desirable. However, if the source and target cloud pool compression policies are compatible then the data may be written to and from the cache in accordance with the compression policies, and possibly in compressed form without being decompressed. Otherwise the data may be decompressed and subsequently compressed again in accordance with the target cloud storage provider compression policy. Aspects of compression policies may include, but are not limited to, supported compression standards and algorithms. It should be noted that compression and decompression may be performed by the cloud storage gateway, the source and target cloud storage providers, or other devices.

In another operation 304 the policies 214, 218 of the source cloud pool 100-1' and the target cloud pool 100-2' with regard to data encryption are checked for compatibility. As already discussed, data is typically stored in encrypted form at the cloud storage providers. If the encryption policy associated with the target cloud storage provider is compatible with the encryption policy associated with the source cloud storage provider encryption then the data may be written to and from the cache in encrypted form without being de-encrypted. Otherwise the data may be de-encrypted and subsequently encrypted again in accordance with the target cloud pool encryption policy. Aspects of encryption policies may include, but are not limited to, supported computational complexity, encryption standards and encryption algorithms. It should be noted that encryption and de-encryption may be performed by the cloud storage gateway or other devices which are part of the enterprise network.

In another operation 306 the encryption keys 216, 220 associated with the source and target cloud pools are checked for compatibility. When a cloud pool instance is created a new set of encryption keys may be generated. If during validation the target cloud storage provider is already in use by any other volumes, e.g., volume 200 on cloud storage provider 100-2, then the encryption keys 216 presently being used for the volume being migrated are compared with the encryption keys 220 being used for the other volume 200. If the encryption keys are not matched then another instance of the target cloud pool 100-2' may be generated. That target cloud pool can then be used without concern for overwriting the encryption keys with the source cloud pool encryption keys. However, either the source, target or new encryption keys may be used for all of the volumes that will reside on the target cloud storage provider. For example, the encryption keys for the volume being migrated may be converted to the encryption keys associated with the target cloud storage provider. Creating a new target cloud pool instance or converting the encryption keys to achieve compatibility helps to avoid conflicts, e.g., overwriting, with encryption keys for other volumes that are already in use in association with the target cloud storage provider.

In another operation 308 the target cloud pool 100-2' policy is verified to specify the same cache, e.g., cache 206, for the volume being migrated as the source cloud pool policy. A verification failure may be indicative of a cache identification error as inputted by the operator.

In another operation 310 it is verified that the target cloud pool 100-2' policy is using a different cloud pool than the source cloud pool 100-1' policy. A verification failure may be indicative of a cloud storage provider identification error as inputted by the operator, e.g., a migration from the source cloud storage provider to the source cloud storage provider.

In another operation 312 the size of the cache 206 is verified to be large enough, and reconfigured if necessary, to accommodate all of the data associated with the volume 112 being migrated. More particularly, the current size of the cache associated with the volume being migrated is examined to determine whether it is large enough to accommodate all volumes associated with the cache in their entirety. If the cache size is inadequate then the cache size is increased to be large enough to accommodate all associated volumes in their entirety. Reconfiguring the cache size includes changing the amount of storage space of the local storage devices available to the cache. This helps to ensure that the cache can accommodate all of the pages of the volume being migrated and helps to avoid a situation where an I/O to a volume that is not being migrated, but which is associated with the same cache, prevents pages of the volume being migrated from being written to the cache, or causes those pages to be ejected from the cache. By setting the size of the cache to be large enough to accommodate all associated volumes in their entirety it is possible for the entire volume being migrated to reside in the cache without being subjected to inadvertent loss of cache pages due to activity associated with other volumes not being migrated. Even if the volume being migrated is the only volume associated with the cache the cache is resized as necessary to accommodate the entire volume being migrated. A new cache may be configured for the volume being migrated if it is impractical or impossible to properly resize the existing cache. Resizing the cache prompts writing to the cache of any volume pages that were not present in the cache.

In another operation 314 cache flushing is temporarily disabled. Dirty pages in the cache are not sent to the source cloud storage provider 100-1 while cache flushing is disabled. Consequently, writing of data associated with the volume being migrated to the source cloud storage provider is halted.

In another operation 316 the cache is verified to contain all of the pages of the volume being migrated. The cloud storage gateway may send I/Os to the source cloud storage provider to prompt provision of any missing volume pages associated with the data. The entire volume being migrated should be present in the cache.

In another operation 318 all cache pages for the volume being migrated are dirtied. This may include changing the state of all pages. Dirtying the pages prepares the pages for flushing in the migration phase. However the pages are not flushed at this point because flushing has been temporarily disabled.

Figure 4:
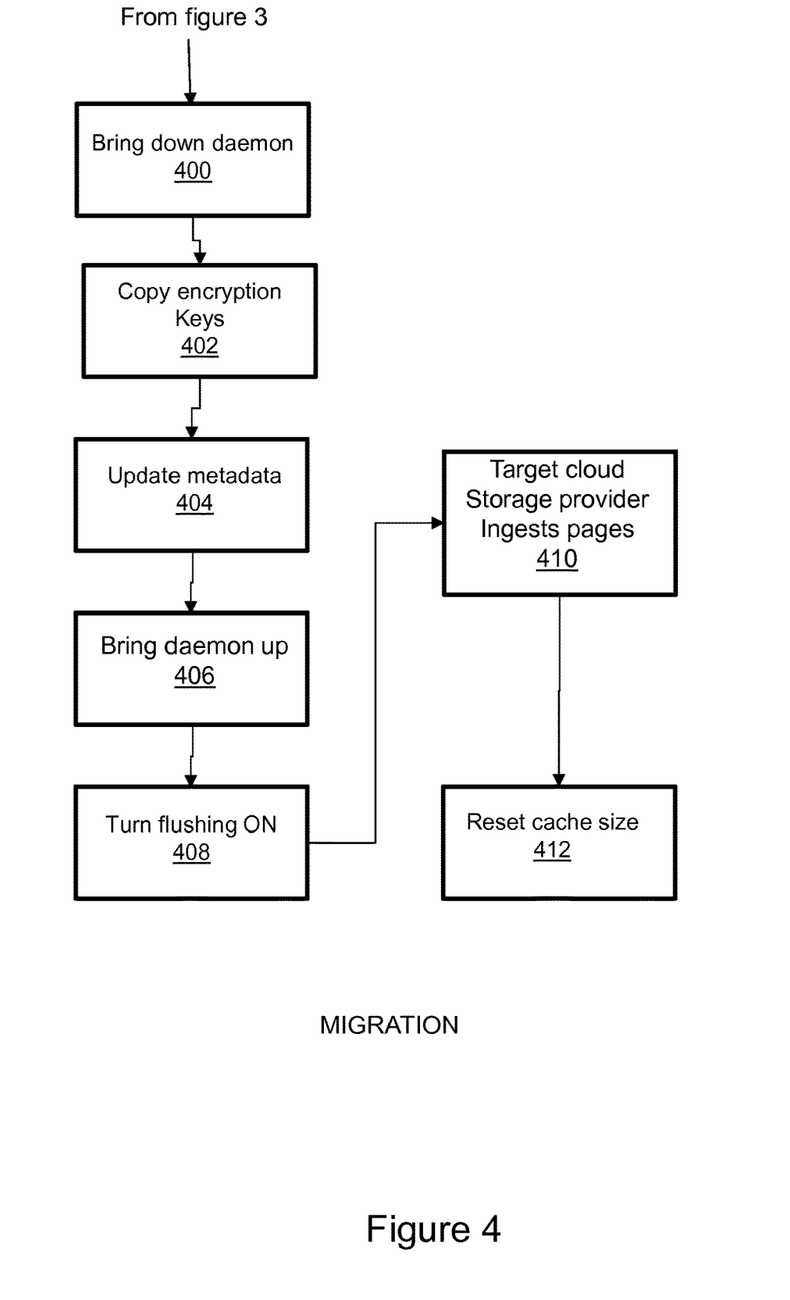
FIG. 4 illustrates data migration via the cloud storage gateway.

Referring to FIGS. 1, 2 and 4, the migration phase writes the volume from the cache to the target cloud storage provider. In one operation 400 the cloud array daemon is brought down. This prepares for metadata update. In another operation 402 the encryption keys 216 are copied from the source cloud pool 100-1' to the target cloud pool 100-2'. In another operation 404 the meta-data 212 associated with the volume at the cloud storage gateway is modified. This may include updating pointers and associating the metadata with the target cloud pool. In another operation 406 the cloud array daemon is brought back up. In another operation 408 flushing is turned on. Turning flushing on causes the dirtied pages to be flushed to the target cloud storage provider. This may be required to be done manually so that the user has the option of reversing the operation. The target cloud storage provider ingests the pages at 410.

Once the cache has been flushed for the volume being migrated the cache size can be reconfigured at 412. For example and without limitation, the cache size can be reconfigured to a size that will not accommodate all associated volumes in their entirety, which may be the size to which the cache was configured prior to volume migration.

Some aspects, features and embodiments may comprise computer components and computer-implemented steps that will be apparent to those skilled in the art. For example, it should be understood by one of skill in the art that the computer-implemented steps may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   at least one physical data storage device;
   a cloud interface in communication with a source cloud storage provider and a target cloud storage provider, an entire data set being stored on the source cloud storage provider in a format that is incompatible with the target cloud storage provider;
   a host interface via which data is exchanged with hosts, and via which a logical data storage device, that comprises a local portion of the entire data set, is presented to the hosts, wherein the local portion of the entire data set is stored on the at least one physical storage device;
   at least one processor that causes a non-local portion of the data set to be obtained from the source cloud storage provider and stored on the at least one physical storage device, verifies that the entire data set is logically stored on the logical storage device, and thereby actually stored on the at least one physical storage device, and transmits the entire data set from the at least one physical storage device to the target cloud storage provider.

2. The apparatus of claim 1 wherein the at least one processor is configured to change a size of the logical storage device to be large enough to accommodate the entire data set.

3. The apparatus of claim 2 wherein the at least one processor is configured to change an amount of space on the at least on physical storage device that is associated with the logical storage device.

4. The apparatus of claim 1 wherein the at least one processor is configured to determine whether a first compression policy associated with the source cloud storage provider is compatible with a second compression policy associated with the target cloud storage provider.

5. The apparatus of claim 1 wherein the at least one processor is configured to determine whether a first encryption policy associated with the source cloud storage provider is compatible with a second encryption policy associated with the target cloud storage provider.

6. The apparatus of claim 1 wherein the at least one processor is configured to update metadata associated with the data set.

7. A method comprising:
   presenting a logical data storage device to at least one host, the logical data storage device comprising a local portion of an entire data set, wherein the entire data set is stored on a source cloud storage provider in a format that is incompatible with a target cloud storage provider;
   storing the local portion on at least one physical data storage device that is local to a gateway;
   obtaining a non-local portion of the entire data set from the source cloud storage provider and storing the non-local portion on the at least one physical storage device;
   verifying that the entire data set is logically stored on a logical storage device and thereby actually stored on at least one physical storage device associated with the logical storage device; and
   transmitting the entire data set from the gateway to the target cloud storage provider.

8. The method of claim 7 further comprising changing a size of the logical storage device to be large enough to accommodate the entire data set.

9. The method of claim 8 further comprising changing an amount of space on the at least on physical storage device that is associated with the logical storage device.

10. The method of claim 7 further comprising determining whether a first compression policy associated with the source cloud storage provider is compatible with a second compression policy associated with the target cloud storage provider.

11. The method of claim 7 further comprising determining whether a first encryption policy associated with the source cloud storage provider is compatible with a second encryption policy associated with the target cloud storage provider.

12. The method of claim 7 further comprising updating metadata associated with the data set.

13. A non-transitory computer-readable medium on which a computer program is stored, the program comprising:
   code which presents a logical data storage device to at least one host, the logical data storage device comprising a local portion of an entire data set, the local portion stored on at least one physical data storage device that is local to a gateway, wherein the entire data set is stored on a source cloud storage provider in a format that is incompatible with a target cloud storage provider;
   code which causes a non-local portion of the entire data set to be obtained from the source cloud storage provider and stored on the at least one physical storage device;

code which verifies that the entire data set is logically stored on a logical storage device and thereby actually stored on at least one physical storage device associated with the logical storage device; and code which transmits the entire data set from the gateway to the target cloud storage provider.

14. The non-transitory computer-readable medium of claim 13, the program further comprising code which changes a size of the logical storage device to be large enough to accommodate the entire data set.

15. The non-transitory computer-readable medium of claim 14, the program further comprising code which changes an amount of space on the at least on physical storage device that is associated with the logical storage device.

16. The non-transitory computer-readable medium of claim 13, the program further comprising code which determines whether a first compression policy associated with the source cloud storage provider is compatible with a second compression policy associated with the target cloud storage provider.

17. The non-transitory computer-readable medium of claim 13, the program further comprising code which determines whether a first encryption policy associated with the source cloud storage provider is compatible with a second encryption policy associated with the target cloud storage provider.

18. The non-transitory computer-readable medium of claim 13, the program further comprising code which updates metadata associated with the data set.

* * * * *